Nov. 14, 1933. E. J. HULLAND ET AL 1,934,980
FEEDING APPARATUS
Filed Aug. 29, 1929    2 Sheets-Sheet 2

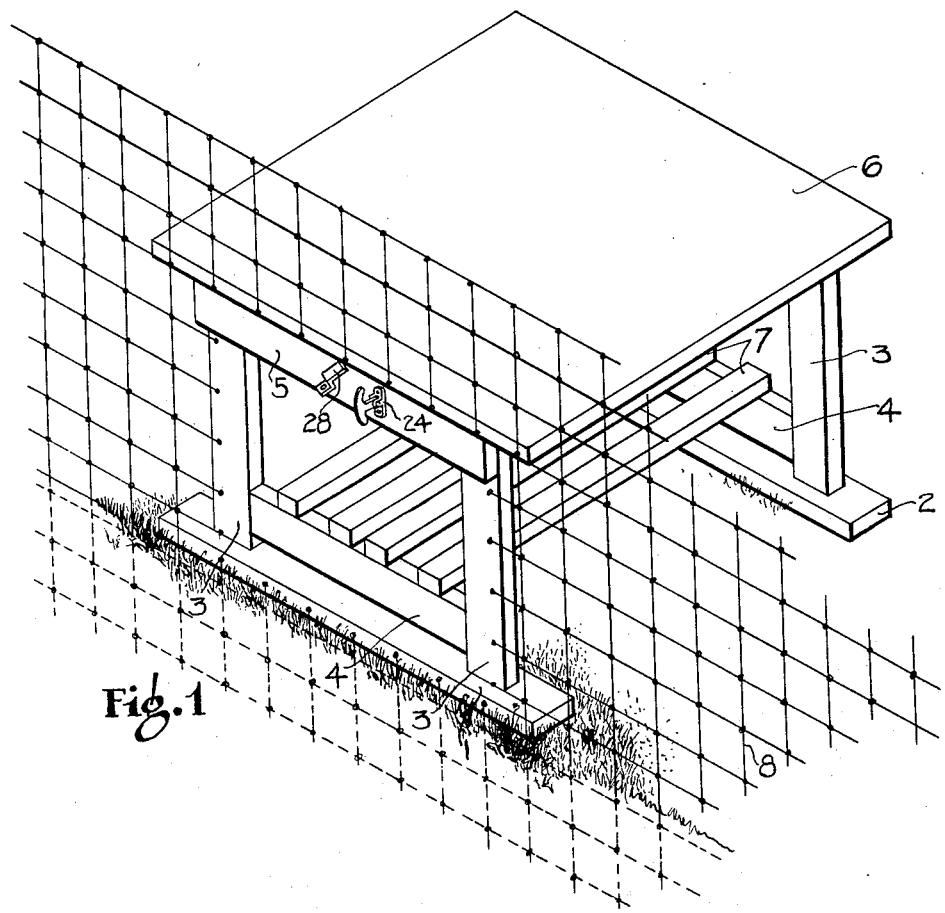
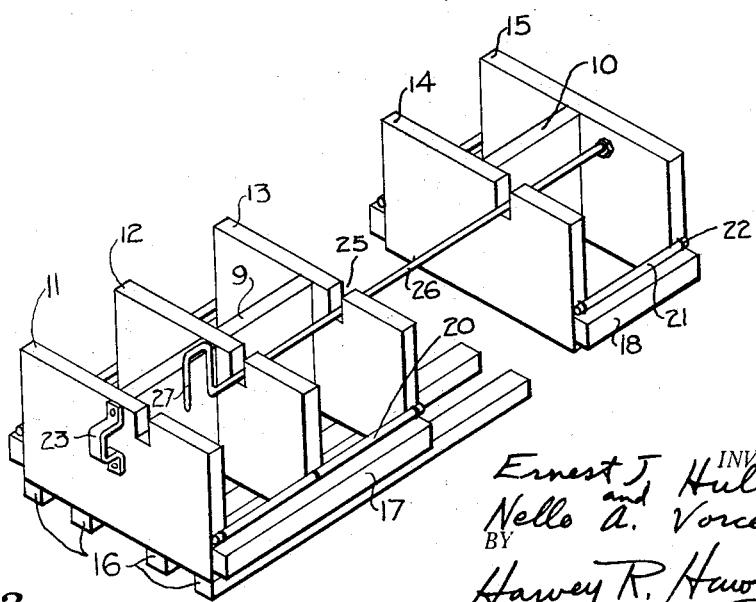

INVENTORS
Ernest J. Hulland
Nello A. Vorce
BY
Harvey R. Hawgood
ATTORNEY.

Patented Nov. 14, 1933

1,934,980

UNITED STATES PATENT OFFICE 1,934,980

FEEDING APPARATUS

Ernest J. Hulland, Chippewa-on-the-Lake, and
Nello A. Vorce, Medina, Ohio

Application August 29, 1929. Serial No. 389,117

4 Claims. (Cl. 119—63)

This invention relates to feeding apparatus and is particularly desirable for use in feeding foxes.

Recently the industry of raising wild animals, particularly foxes, for their fur has become rather extensive and in the care of these animals numerous problems have presented themselves which problems were not apparent in the care of ordinary domestic animals, and it has been found that the ordinary means of feeding, such as by use of a trough, pan or the like set upon the ground is extremely unsatisfactory. In the first place foxes, if fed out of pans, will remove the same, necessitating considerable labor and annoyance in finding the pans. Secondly the foxes are generally kept in pairs in fenced-in enclosures and at times, particularly during the breeding season, the male fox evinces an inclination to prevent the female fox from getting sufficient food, and it is found that where this food is disposed in an open space he will drive her away and prevent her from eating enough to keep herself in good healthy condition. It has also been found that if feeding troughs or boxes are arranged near a corner of the fence or in any other place where absolutely free access is not permitted the foxes will fight in the partial enclosures so formed that one is frequently seriously injured. Moreover, in the present large fox farms there are a great many pens and the labor of feeding the foxes is considerable and a decrease in labor and time spent at each pen is very desirable.

It is an object of the present invention to eliminate the disadvantages of prior feeding arrangements.

Other objects will hereinafter appear.

The invention will be better understood from the description of one practical embodiment thereof illustrated in the accompanying drawings, in which:

Figure 1 is a perspective view of the frame work of a feeding device;

Figure 2 is a perspective view of the containers in which the feeding pans are arranged;

Figure 3:
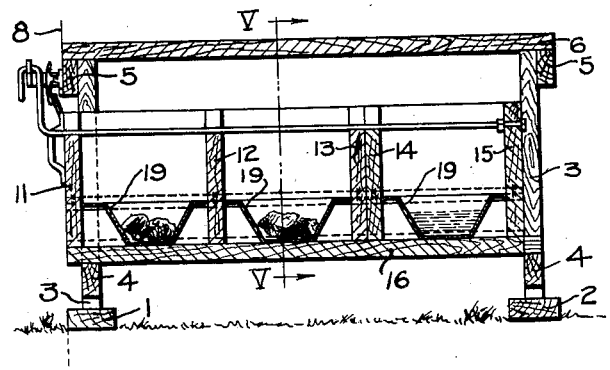
Figure 3 is a longitudinal sectional view of the assembled feeding apparatus, taken on the line III—III of Figure 5.

The feeding device consists in general of a stationary frame in which is mounted a drawer-like carrier for a plurality of pans in which food and water may be placed. One end of the frame is placed at an opening through the fence surrounding the pen so that the drawer may be pulled out from the exterior of the pen, filled, and then shoved back, to give the foxes access to the pans from the partially open sides of the drawer.

As the foxes are not given water every day, in fact are watered only every other day in the hottest weather and are not given water at all during the winter months, the rear part of the carrier is made separately from the front part, in which the food is to be placed, so that the water containing compartments need not be pulled out on days when no water is to be given the foxes. The saving in labor for each pen thus effected is not great, but the saving in labor for each feeding of a plurality of pens is very considerable, particularly as one or two men deliver food to several hundred pens every day.

The structure of the frame is as follows:—Two sills 1 and 2 rest upon the ground and from each of these extends upwardly a pair of upright members 3, the members of each pair being connected by a lower horizontal beam 4 and an upper horizontal beam 5. The upper horizontal beams support a horizontal roof or cover 6, while the lower horizontal beams have secured to their upper surface a plurality of slats 7 upon the upper surfaces on which the carrier may slide.

The wire fence 8 surrounding the pen has a portion cut away to clear the opening in the front of the frame and the ends of the wires are secured to the frame.

The frame is mounted in an intermediate part of a straight section of fence so that free access is provided to both sides and an animal at either side has an unobstructed retreat, and is so arranged that each member of the pair can eat on a separate side. If the male fox attempts to come around and chase the female fox away as frequently happens, she can jump over the roof and eat on the other side, while if he attempts to come over the roof she can run around the end and so gets an equal proportion of the food.

The carrier consists of a central partition formed in two parts 9 and 10 and a plurality of transverse partitions 11, 12, 13, 14 and 15 dividing the same into six compartments, as best shown in Figure 2. The bottom of the carrier consists of slats 16 alternating with those of the frame, the slats being attached to transverse partitions 11, 12 and 13 and extending beneath the compartments between partitions 14 and 15.

The sides of the carrier are provided with slats 17 and 18 to retain pans 19 within the compartments and metal rods 20 and 21 are secured to the sides of the transverse partitions as by staples 22 to overlie the flanged margins of the pans, so that the foxes cannot remove them from the compartments. It is found necessary to use metal for this purpose to prevent the same from being chewed through in an attempt to dislodge the pans.

Figure 4:
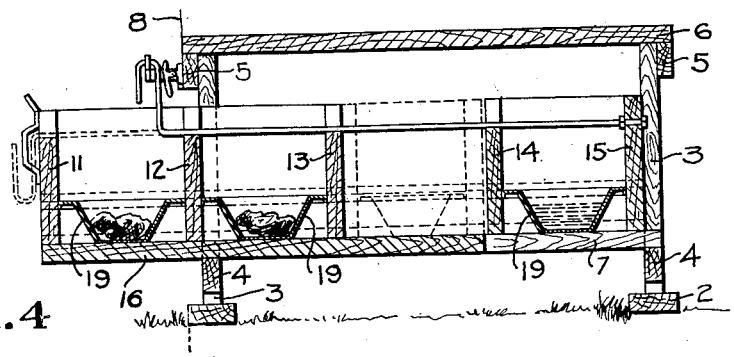
Figure 4 is a similar sectional view showing how the compartments are moved out for filling; and, Figure 5 is a transverse sectional view taken on the line V—V of Figure 3.
Figure 5:
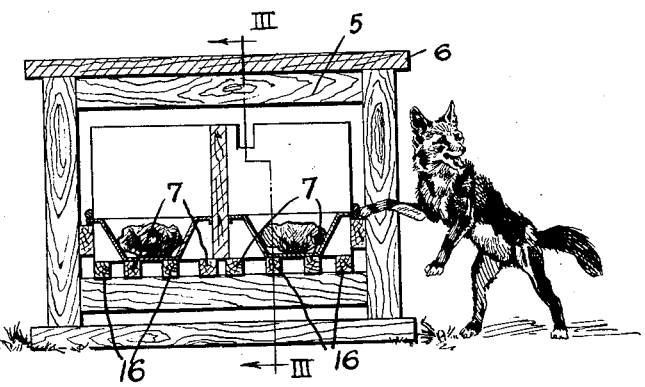

The pans in the two rear compartments may rest upon either the stationary slats 7 or the slats 16 of the carrier so that these compartments may be left within the frame or may be pulled out with the remainder of the carrier as is desired, and the pans properly supported at all times. The carrier is provided with a handle 23 by which it may be pulled forward, the same being engaged by a hook 24 carried by beam 5 to retain it in place. The transverse partitions 11, 12 and 13 are each notched as indicated at 25 and through these notches extends a metal rod 26 which is pivotally mounted at its end in partition 15. The forward end of this rod extends beyond the frame and is formed into a hook 27. Carried by beam 5 is a Z-shaped bracket 28 over which this hook may be placed. When this is done the rod will prevent the two rear compartments from moving forward as the rest of the carrier is pulled out, so that the labor in sliding the first four compartments out and back will be less than if the whole carrier were moved. These two rear compartments are used to contain water and so need not be moved except occasionally. When it is desired to draw all six compartments out of the frame, it is only necessary to rotate the hook 27 so that the same overlies the front of the partition 11, as shown in dotted lines in Figure 4, and when the parts are thus arranged all six compartments are drawn out, as though they were integrally connected as also indicated by dotted lines in Figure 4.

The slats 17 and bars 20 are low enough that the foxes can put their fore paws upon them and consequently do not wear the fur off their chests in reaching into the pans, while they effectively retain these pans in place and prevent the foxes from carrying them off. These sides are also low enough so that the pups can climb into the pans and so eat solid food before they are big enough to reach over the sides.

The pens are customarily arranged in rows with an alley between consecutive rows, so that the feeding devices can be placed in pairs opposite each other. The feeding can then be conveniently done by driving a wagon along the alley and stopping and filling two feeding devices, one on each side of the alley, at intervals along its length.

It will be seen that the labor necessary is comparatively little; that the person feeding the foxes does no need to open the door of the pen or go into it as was the prior practice, but can reach all the pans from the alley; that the pans cannot be removed; and that both foxes of each pair are insured an adequate quantity of food. Beside being a waste of effort to go into the pens and fill the pans, even if it is not necessary to hunt for these in the tall grass within the pen, this entering of the pens is undesirable because it unduly alarms the foxes and it has been found essential to disturb them as little as possible. The apparatus of the invention eliminates the element of disturbance, besides achieving the saving in labor above set forth.

While we have described the illustrated embodiment of our invention in some particularity, obviously many others will readily occur to those skilled in this art, and we do not therefore limit ourselves to the precise details shown and described, but claim as our invention all variations, modifications and embodiments thereof coming within the scope of the appended claims.

We claim:

1. A fox feeding apparatus comprising a frame adapted to have one end positioned adjacent to and projecting through the fence of a pen, a carrier completely barring the passage of an animal through the frame slidable in said frame from within to without the pen, a central partition extending throughout the length of the carrier, and containers for food and water on each side of said partition.

2. A fox feeding apparatus for use in conjunction with a pen and adapted to be positioned with one end adjacent the fence of a pen which comprises a frame, a central partition within the frame extending in a direction normal to said end, capable of completely preventing passage of an animal through the frame, a cover for said frame, the sides of the frame being open, and containers on each side of said partition.

3. A fox feeding device comprising a frame adapted to have one end positioned adjacent to and projecting through the fence of a pen, a two-part drawer-like support slidable within the frame, a barrier impassable to foxes within said frame, means for pulling one part of said support to the exterior of the frame, and means for selectively locking the other part of the support in position within the frame or to the first mentioned part.

4. A fox feeding device comprising a frame adapted to have one end positioned adjacent and projecting through the fence of a pen, slats in the bottom of the frame, a two-part drawer like support slidable upon said slats, a barrier bisecting the support and impassable to foxes, the forward part of said support having slats alternating with those of the frame and extending beneath the rear part, and means for selectively locking the rear part in position in the frame or to move with the forward part.

ERNEST J. HULLAND.
NELLO A. VORCE.